United States Patent
Lee et al.

(10) Patent No.: US 11,678,298 B2
(45) Date of Patent: Jun. 13, 2023

(54) RESPONSE TO PAGING FOR DATA RECEPTION

(71) Applicant: LG ELECTRONICS INC., Seoul (KR)

(72) Inventors: Youngdae Lee, Seoul (KR); Hyunjung Choe, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 17/269,161

(22) PCT Filed: Oct. 7, 2019

(86) PCT No.: PCT/KR2019/013110
§ 371 (c)(1),
(2) Date: Feb. 17, 2021

(87) PCT Pub. No.: WO2020/076032
PCT Pub. Date: Apr. 16, 2020

(65) Prior Publication Data
US 2021/0329593 A1    Oct. 21, 2021

Related U.S. Application Data

(60) Provisional application No. 62/742,437, filed on Oct. 7, 2018.

(51) Int. Cl.
*H04W 68/02* (2009.01)
*H04W 76/27* (2018.01)
*H04W 72/14* (2009.01)

(52) U.S. Cl.
CPC .................. *H04W 68/02* (2013.01)

(58) Field of Classification Search
CPC ...... H04W 68/02; H04W 76/27; H04W 72/14
USPC ........................................................ 455/458
See application file for complete search history.

(56) References Cited

U.S. PATENT DOCUMENTS

| | | | |
|---|---|---|---|
| 9,462,576 B2* | 10/2016 | Lee ......................... | H04L 47/10 |
| 10,873,380 B2* | 12/2020 | Nader ................. | H04W 72/046 |
| 2010/0138541 A1* | 6/2010 | Zhu ........................ | H04W 28/06 |
| | | | 709/226 |
| 2011/0003603 A1 | 1/2011 | Park et al. | |
| 2015/0257144 A1* | 9/2015 | Hooli .................... | H04W 72/21 |
| | | | 370/329 |
| 2017/0367058 A1* | 12/2017 | Pelletier ............... | H04W 52/246 |
| 2018/0263012 A1 | 9/2018 | Ryu et al. | |
| 2018/0376422 A1* | 12/2018 | Shu ....................... | H04W 76/27 |

(Continued)

FOREIGN PATENT DOCUMENTS

| | | |
|---|---|---|
| EP | 3361796 | 8/2018 |
| WO | 2016182530 | 11/2016 |

OTHER PUBLICATIONS

3GPP TSG RAN; NR; RRC protocol specification (Release 15), 3GPP TS 38.331 V15.3.0, Sep. 26, 2018, see p. 22.

*Primary Examiner* — Inder P Mehra
(74) *Attorney, Agent, or Firm* — Dentons US LLP

(57) ABSTRACT

Provided are a method for responding to a paging. According to an embodiment of the present disclosure, the method includes receiving a configuration of a pre-allocated resource, receiving, in a paging occasion, information on type of resource for a response message, transmitting the response message on the pre-allocated resource, based on that the information informs the pre-allocated resource.

12 Claims, 12 Drawing Sheets

(56) References Cited

U.S. PATENT DOCUMENTS

2019/0098542 A1\* 3/2019 Tang ................. H04W 36/0079
2020/0221419 A1\* 7/2020 Na ........................ H04W 16/28

\* cited by examiner

RESPONSE TO PAGING FOR DATA RECEPTION

This application is the National Stage filing under 35 U.S.C. 371 of International Application No. PCT/KR2019/013110, filed on Oct. 7, 2019, which claims the benefit of U.S. Provisional Application No. 62/742,437 filed on Oct. 7, 2018, the contents of which are all hereby incorporated by reference herein in their entirety.

TECHNICAL FIELD

The present disclosure relates to responding to paging.

BACKGROUND

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

With the introduction of the new RRC state (i.e., RRC-INACTIVE state) in NR, the UE may incur minimum signaling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

SUMMARY

According to the prior art, a UE may receive downlink data in RRC_IDLE or RRC_INACTIVE or RRC_CONNECTED. However, when paging is received, the UE may not know how downlink data will be transmitted. Thus, UE cannot know how to respond to Paging. For example, when the UE receives a paging, the UE may transmit a response message via a configured grant, or via a RACH procedure. That is, the UE may not recognize which resource to use for transmitting the response message.

According to an embodiment of the present disclosure, a method performed by a wireless device in a wireless communication system is provided. The method may comprise receiving a configuration of a pre-allocated resource, receiving, in a paging occasion, information on type of resource for a response message, and transmitting the response message on the pre-allocated resource, based on that the information informs the pre-allocated resource.

The present disclosure can have various advantageous effects.

For example, the UE may recognize the resource type to be used for delivering DL data, by informing the information on the resource type via paging.

For example, the UE may recognize which resource to be used for response to the paging.

For example, the UE may activate configured grant by receiving paging, so that the activating process may be simplified.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
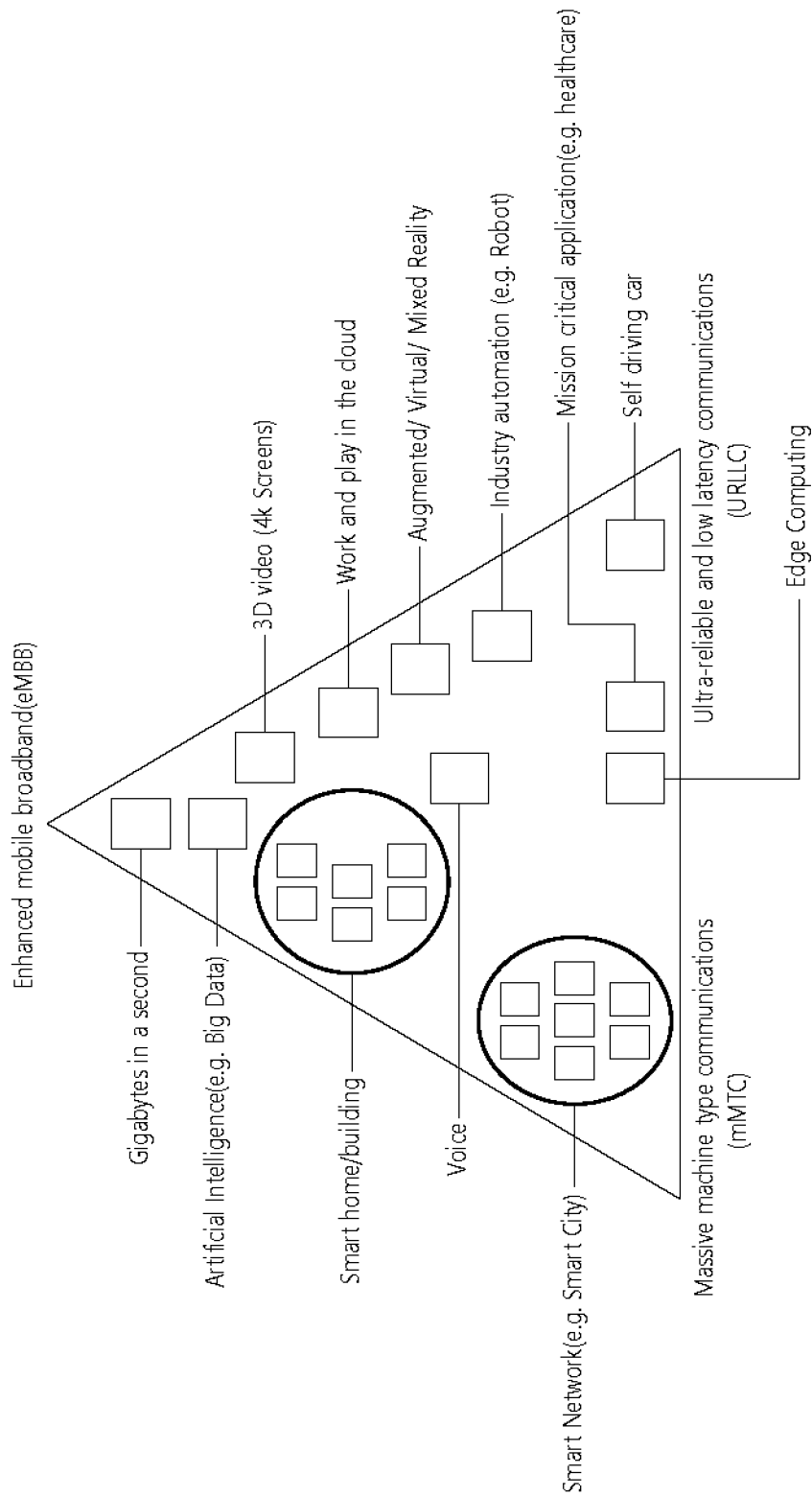
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
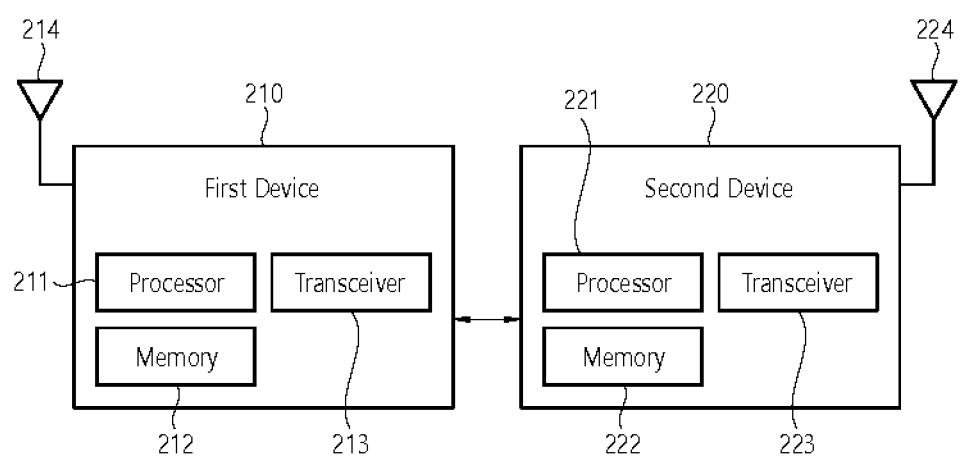
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
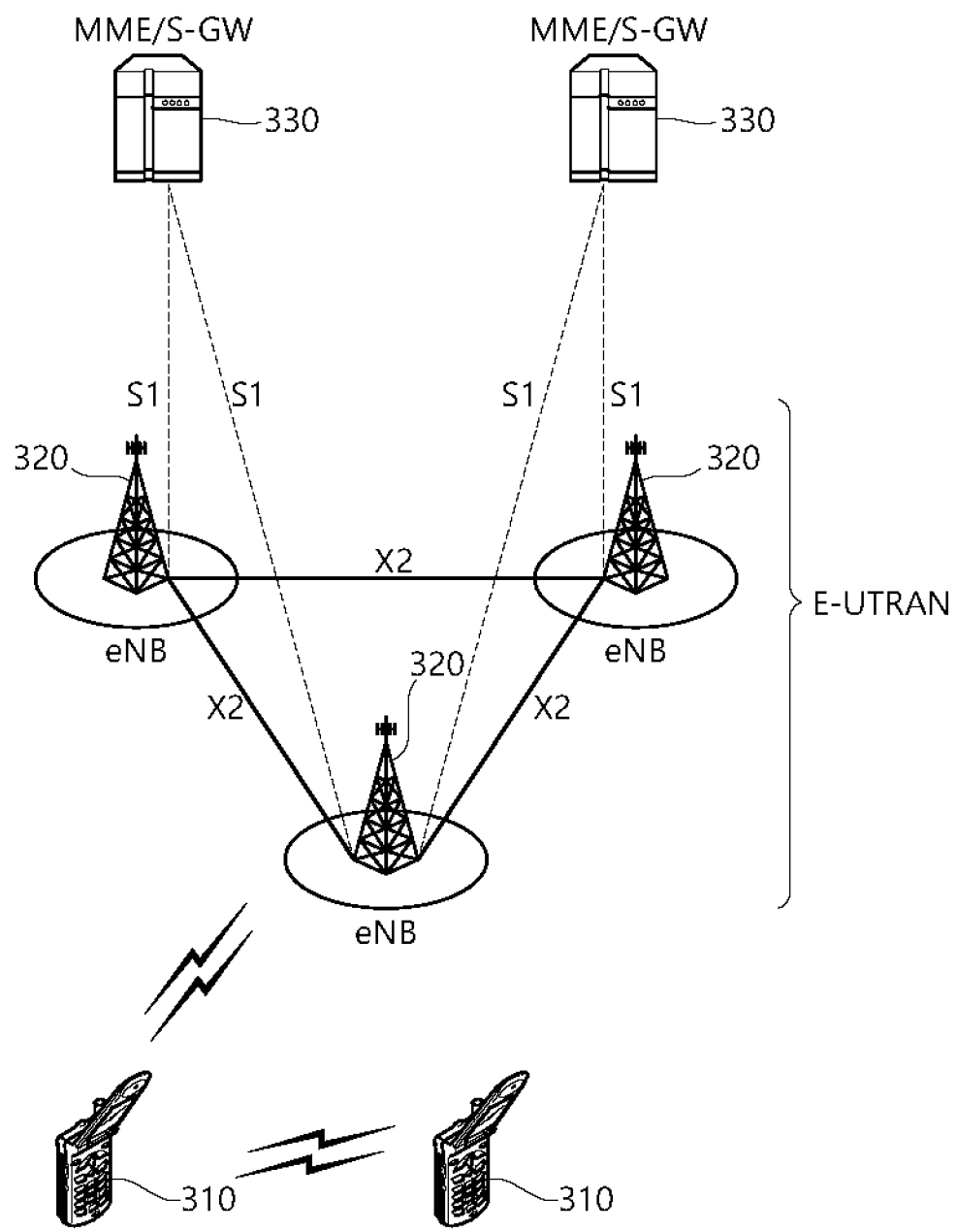
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
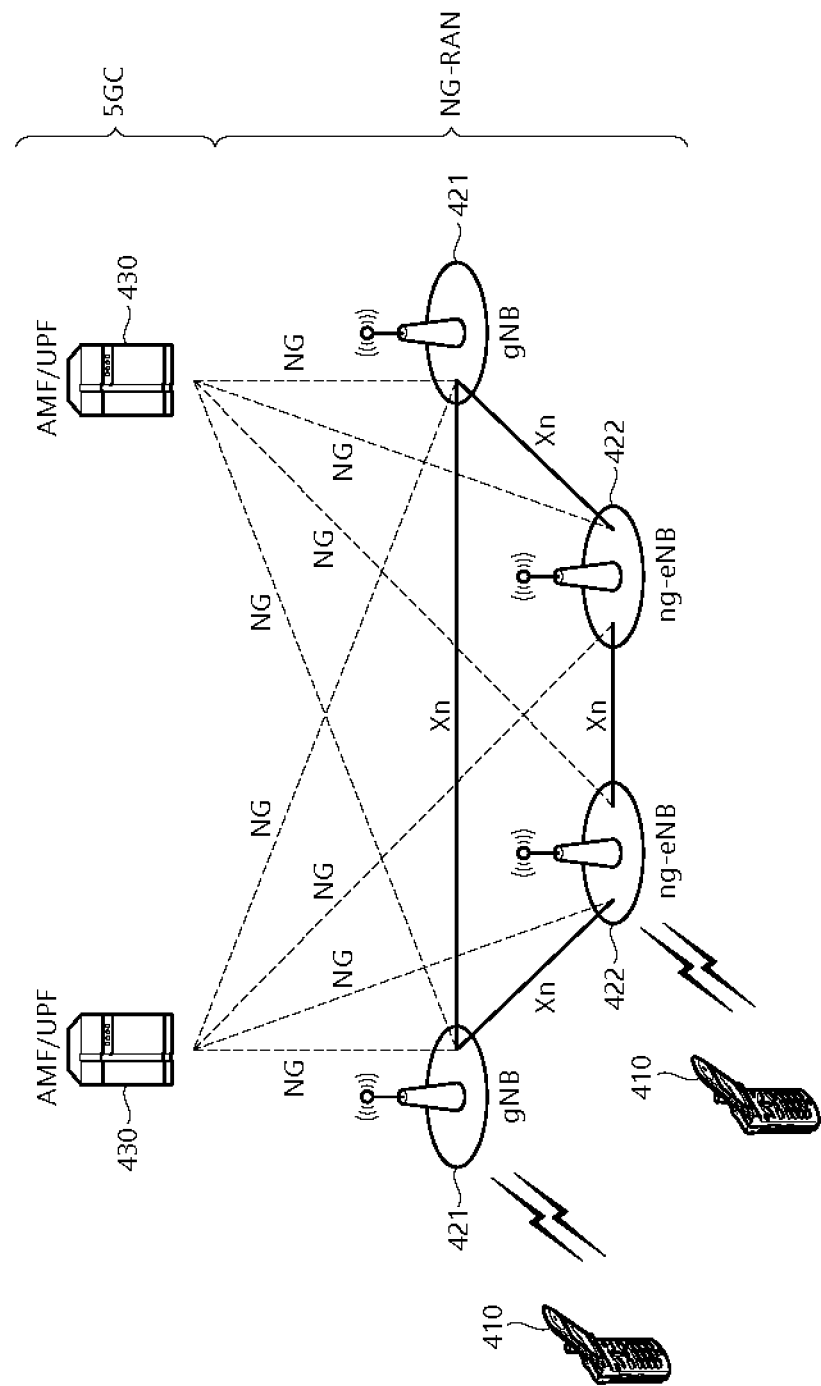
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
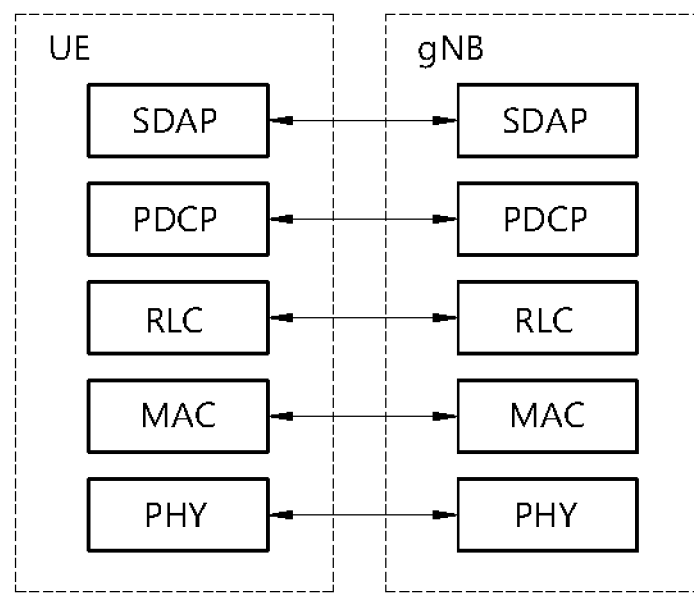
FIG. 5 shows a block diagram of a user plane protocol stack to which the technical features of the present disclosure can be applied.
Figure 6:
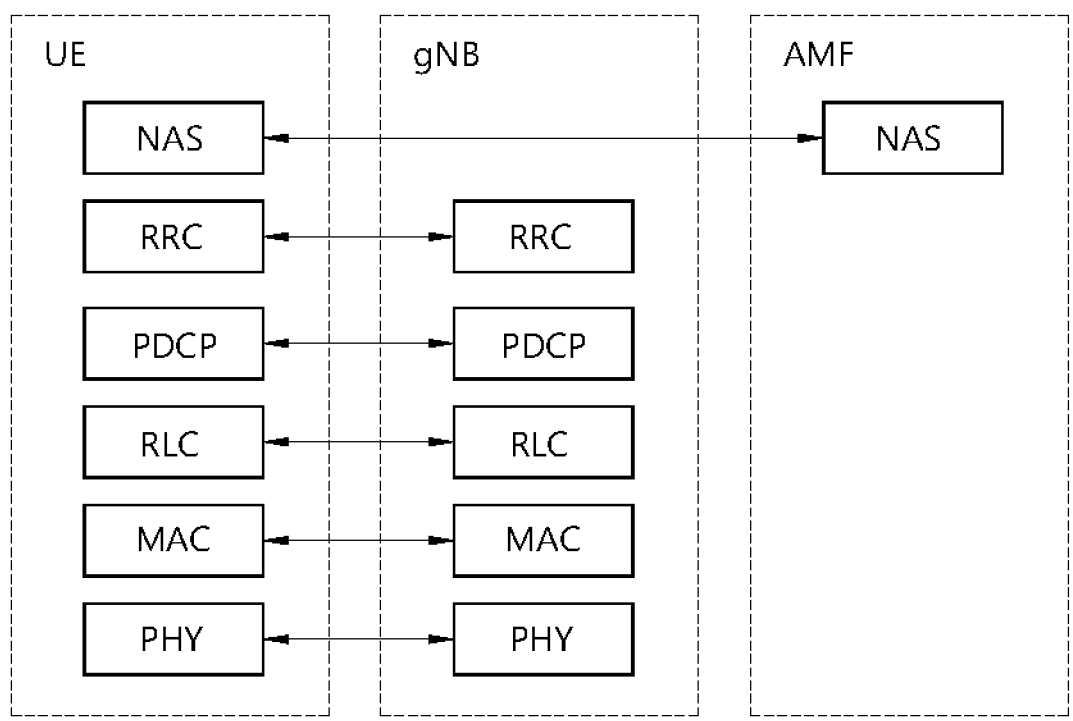
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, random access procedure is described.

The Random Access procedure is initiated by a PDCCH order, by the MAC sublayer itself or by the RRC sublayer. Random Access procedure on a SCell shall only be initiated by a PDCCH order. If a MAC entity receives a PDCCH transmission consistent with a PDCCH order masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE, the Random Access procedure is performed on the anchor carrier or one of the non-anchor carriers for which PRACH resource has been configured in system information.

Before the procedure can be initiated, the following information for related Serving Cell is assumed to be available for UEs other than NB-IoT UEs, BL UEs or UEs in enhanced coverage, unless explicitly stated otherwise:
  the available set of PRACH resources for the transmission of the Random Access Preamble, prach-ConfigIndex.
  the groups of Random Access Preambles and the set of available Random Access Preambles in each group (SpCell only):
  The preambles that are contained in Random Access Preambles group A and Random Access Preambles group B are calculated from the parameters numberOfRA-Preambles and sizeOfRA-PreamblesGroupA:
  If sizeOfRA-PreamblesGroupA is equal to numberOfRA-Preambles then there is no Random Access Preambles group B. The preambles in Random Access Preamble group A are the preambles 0 to sizeOfRA-PreamblesGroupA−1 and, if it exists, the preambles in Random Access Preamble group B are the preambles sizeOfRA-PreamblesGroupA to numberOfRA-Preambles−1 from the set of 64 preambles.
    if Random Access Preambles group B exists, the thresholds, messagePowerOffsetGroupB and messageSizeGroupA, the configured UE transmitted power of the Serving Cell performing the Random Access Procedure, PCMAX, c, and the offset between the preamble and Msg3, deltaPreambleMsg3, that are required for selecting one of the two groups of Random Access Preambles (SpCell only).
  the RA response window size ra-ResponseWindowSize.
  the power-ramping factor powerRampingStep.
  the maximum number of preamble transmission preambleTransMax.
  the initial preamble power preambleInitialReceivedTargetPower.
  the preamble format based offset DELTA_PREAMBLE.
  the maximum number of Msg3 HARQ transmissions maxHARQ-Msg3Tx (SpCell only).
  the Contention Resolution Timer mac-ContentionResolutionTimer (SpCell only).

NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage:
  if the UE is a BL UE or a UE in enhanced coverage:

the available set of PRACH resources associated with each enhanced coverage level supported in the Serving Cell for the transmission of the Random Access Preamble, prach-ConfigIndex.

for EDT, the available set of PRACH resources associated with EDT for each enhanced coverage level supported in the Serving Cell for the transmission of the Random Access Preamble, prach-ConfigIndex.

the groups of Random Access Preambles and the set of available Random Access Preambles in each group (SpCell only):

If sizeOfRA-PreamblesGroupA is not equal to numberOfRA-Preambles:

Random Access Preambles group A and B exist and are calculated as above;

else:

the preambles that are contained in Random Access Preamble groups for each enhanced coverage level, if it exists, are the preambles firstPreamble to lastPreamble.

NOTE: When a PRACH resource is shared for multiple enhanced coverage levels, and enhanced coverage levels are differentiated by different preamble indices, Group A and Group B is not used for this PRACH resource.

if the UE is an NB-IoT UE:

the available set of PRACH resources supported in the Serving Cell on the anchor carrier, nprach-ParametersList, and on the non-anchor carriers, in ul-ConfigList.

for EDT, the available set of PRACH resources associated with EDT on anchor carrier, nprach-ParametersList-EDT, and on the non-anchor carriers, in ul-ConfigList.

for random access resource selection and preamble transmission:

a PRACH resource is mapped into an enhanced coverage level.

each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers. Each group is referred to as a Random Access Preamble group below in the procedure text.

a subcarrier is identified by the subcarrier index in the range:

[nprach-SubcarrierOffset, nprach-SubcarrierOffset+nprach-NumSubcarriers−1]

each subcarrier of a Random Access Preamble group corresponds to a

Random Access Preamble.

when the subcarrier index is explicitly sent from the eNB as part of a PDCCH order ra-PreambleIndex shall be set to the signalled subcarrier index.

the mapping of the PRACH resources into enhanced coverage levels is determined according to the following:

the number of enhanced coverage levels is equal to one plus the number of RSRP thresholds present in rsrp-ThresholdsPrachInfoList.

each enhanced coverage level has one anchor carrier PRACH resource present in nprach-ParametersList and zero or one PRACH resource for each non-anchor carrier signalled in ul-ConfigList.

for EDT, each enhanced coverage level has zero or one anchor carrier PRACH resource present in nprach-ParametersList-EDT and zero or one PRACH resource for each non-anchor carrier signalled in ul-ConfigList.

enhanced coverage levels are numbered from 0 and the mapping of PRACH resources to enhanced coverage levels are done in increasing numRepetitionsPerPreambleAttempt order.

when multiple carriers provide PRACH resources for the same enhanced coverage level, the UE will randomly select one of them using the following selection probabilities:

the selection probability of the anchor carrier PRACH resource for the given enhanced coverage level, nprach-ProbabilityAnchor, is given by the corresponding entry in nprach-ProbabilityAnchorList the selection probability is equal for all non-anchor carrier PRACH resources and the probability of selecting one PRACH resource on a given non-anchor carrier is (1−nprach-ProbabilityAnchor)/(number of non-anchor NPRACH resources)

the criteria to select PRACH resources based on RSRP measurement per enhanced coverage level supported in the Serving Cell rsrp-ThresholdsPrachInfoList.

the maximum number of preamble transmission attempts per enhanced coverage level supported in the Serving Cell maxNumPreambleAttemptCE.

the number of repetitions required for preamble transmission per attempt for each enhanced coverage level supported in the Serving Cell numRepetitionPerPreambleAttempt.

the configured UE transmitted power of the Serving Cell performing the Random Access Procedure, PCMAX, c.

the RA response window size ra-ResponseWindowSize and the Contention Resolution Timer mac-ContentionResolutionTimer (SpCell only) per enhanced coverage level supported in the Serving Cell.

for EDT, the Contention Resolution Timer mac-ContentionResolutionTimer configured for EDT (SpCell only) per enhanced coverage level supported in the Serving Cell.

the power-ramping factor powerRampingStep and optionally powerRampingStepCE1.

the maximum number of preamble transmission preambleTransMax-CE.

the initial preamble power preambleInitialReceivedTargetPower and optionally preambleInitialReceivedTargetPowerCE1.

the preamble format based offset DELTA_PREAMBLE. For NB-IoT the DELTA_PREAMBLE is set to 0.

for NB-IoT, the use of contention free random access ra-CFRA-Config.

The Random Access procedure shall be performed as follows:

Flush the Msg3 buffer;

set the PREAMBLE_TRANSMISSION_COUNTER to 1;

if the UE is an NB-IoT UE, a BL UE or a UE in enhanced coverage:

set the PREAMBLE_TRANSMISSION_COUNTER_CE to 1;

if the starting enhanced coverage level, or for NB-IoT the starting number of NPRACH repetitions, has been indicated in the PDCCH order which initiated the Random Access procedure, or if the starting enhanced coverage level has been provided by upper layers:

the MAC entity considers itself to be in that enhanced coverage level regardless of the measured RSRP;

else:

if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
the MAC entity considers to be in enhanced coverage level 3;
else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
the MAC entity considers to be in enhanced coverage level 2;
else if the measured RSRP is less than the RSRP threshold of enhanced coverage level 1 as configured by upper layers in rsrp-ThresholdsPrachInfoList then:
the MAC entity considers to be in enhanced coverage level 1;
else:
the MAC entity considers to be in enhanced coverage level 0;
set the backoff parameter value to 0 ms;
for the RN, suspend any RN subframe configuration;
proceed to the selection of the Random Access Resource.

There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

An NB-IoT UE measures RSRP on the anchor carrier.

Downlink assignments transmitted on the PDCCH indicate if there is a transmission on a DL-SCH for a particular MAC entity and provide the relevant HARQ information.

When the MAC entity has a C-RNTI, Semi-Persistent Scheduling C-RNTI, or Temporary C-RNTI, the MAC entity shall for each TTI during which it monitors PDCCH and for each Serving Cell:
if a downlink assignment for this TTI and this Serving Cell has been received on the PDCCH for the MAC entity's C-RNTI, or Temporary C-RNTI:
if this is the first downlink assignment for this Temporary C-RNTI:
consider the NDI to have been toggled.
if the downlink assignment is for the MAC entity's C-RNTI and if the previous downlink assignment indicated to the HARQ entity of the same HARQ process was either a downlink assignment received for the MAC entity's Semi-Persistent Scheduling C-RNTI or a configured downlink assignment:
consider the NDI to have been toggled regardless of the value of the NDI.
indicate the presence of a downlink assignment and deliver the associated HARQ information to the HARQ entity for this TTI.
else, if this Serving Cell is the SpCell and a downlink assignment for this TTI has been received for the SpCell on the PDCCH of the SpCell for the MAC entity's Semi-Persistent Scheduling C-RNTI:
if the NDI in the received HARQ information is 1:
consider the NDI not to have been toggled;
indicate the presence of a downlink assignment and deliver the associated HARQ information to the HARQ entity for this TTI.
else, if the NDI in the received HARQ information is 0:
if PDCCH contents indicate SPS release:
clear the configured downlink assignment (if any);
if the timeAlignmentTimer associated with the pTAG is running:
indicate a positive acknowledgement for the downlink SPS release to the physical layer.
else:
store the downlink assignment and the associated HARQ information as configured downlink assignment;
initialise (if not active) or re-initialise (if already active) the configured downlink assignment to start in this TTI and to recur according to rules;
set the HARQ Process ID to the HARQ Process ID associated with this TTI;
consider the NDI bit to have been toggled;
indicate the presence of a configured downlink assignment and deliver the stored HARQ information to the HARQ entity for this TTI.
else, if this Serving Cell is the SpCell and a downlink assignment for this TTI has been configured for the SpCell and there is no measurement gap in this TTI and there is no Sidelink Discovery Gap for Reception in this TTI; and
if this TTI is not an MBSFN subframe of the SpCell or the MAC entity is configured with transmission mode tm9 or tm10 on the SpCell:
instruct the physical layer to receive, in this TTI, transport block on the DL-SCH according to the configured downlink assignment and to deliver it to the HARQ entity;
set the HARQ Process ID to the HARQ Process ID associated with this TTI;
consider the NDI bit to have been toggled;
indicate the presence of a configured downlink assignment and deliver the stored HARQ information to the HARQ entity for this TTI.
if the MAC entity is configured with rach-Skip or rach-SkipSCG and a UE Contention Resolution Identity MAC control element for this TTI has been received on the PDSCH indicated by the PDCCH of the SpCell addressed to the C-RNTI:
indicate to upper layer the successful reception of a PDCCH transmission addressed to the C-RNTI.

Semi-Persistent Scheduling is described.

When Semi-Persistent Scheduling is enabled by RRC, the following information is provided:
Semi-Persistent Scheduling C-RNTI or UL Semi-Persistent Scheduling V-RNTI;
Uplink Semi-Persistent Scheduling interval semiPersistSchedIntervalUL and number of empty transmissions before implicit release implicitReleaseAfter, if Semi-Persistent Scheduling with Semi-Persistent Scheduling C-RNTI is enabled for the uplink;
Uplink Semi-Persistent Scheduling interval semiPersistSchedIntervalUL and number of empty transmissions before implicit release implicitReleaseAfter for each SPS configuration, if Semi-Persistent Scheduling with UL Semi-Persistent Scheduling V-RNTI is enabled for the uplink;
Whether twoIntervalsConfig is enabled or disabled for uplink, only for TDD;
Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink;

When Semi-Persistent Scheduling for uplink or downlink is disabled by RRC, the corresponding configured grant or configured assignment shall be discarded.

Semi-Persistent Scheduling is supported on the SpCell only.

Semi-Persistent Scheduling is not supported for RN communication with the E-UTRAN in combination with an RN subframe configuration.

When eIMTA is configured for the SpCell, if a configured uplink grant or a configured downlink assignment occurs on a subframe that can be reconfigured through eIMTA L1 signalling, then the UE behaviour is left unspecified.

After a Semi-Persistent downlink assignment is configured, the MAC entity shall consider sequentially that the Nth assignment occurs in the subframe for which:

(10*SFN+subframe)=[(10*SFNstart time+subframestart time)+$N$*semiPersistSchedIntervalDL] modulo 10240.

Where SFNstart time and subframestart time are the SFN and subframe, respectively, at the time the configured downlink assignment were (re-)initialised.

For BL UEs or UEs in enhanced coverage SFNstart time and subframestart time refer to SFN and subframe of the first transmission of PDSCH where configured downlink assignment was (re-)initialized.

After a Semi-Persistent Scheduling uplink grant is configured, the MAC entity shall:
if twoIntervalsConfig is enabled by upper layer:
set the Subframe_Offset.
else:
set Subframe_Offset to 0.
consider sequentially that the Nth grant occurs in the subframe for which:

(10*SFN+subframe)=[(10*SFNstart time+subframestart time)+$N$*semiPersistSchedIntervalUL+ Subframe_Offset*($N$ modulo 2)] modulo 10240.

Where SFNstart time and subframestart time are the SFN and subframe, respectively, at the time the configured uplink grant were (re-)initialised.

For TDD, the MAC entity is configured with semiPersistSchedIntervalUL shorter than 10 subframes, the Nth grant shall be ignored if it occurs in a downlink subframe or a special subframe.

If the MAC entity is not configured with skipUplinkTxSPS, the MAC entity shall clear the configured uplink grant immediately after implicitReleaseAfter number of consecutive new MAC PDUs each containing zero MAC SDUs have been provided by the Multiplexing and Assembly entity, on the Semi-Persistent Scheduling resource.

If SPS confirmation has been triggered and not cancelled:
if the MAC entity has UL resources allocated for new transmission for this TTI:
instruct the Multiplexing and Assembly procedure to generate an SPS confirmation MAC Control Element;
cancel the triggered SPS confirmation.

The MAC entity shall clear the configured uplink grant immediately after first transmission of SPS confirmation MAC Control Element triggered by the SPS release.

Retransmissions for Semi-Persistent Scheduling can continue after clearing the configured uplink grant.

For BL UEs or UEs in enhanced coverage SFNstart time and subframestart time refer to SFN and subframe of the first transmission of PUSCH where configured uplink grant was (re-)initialized.

In the event of a resource conflict between multiple UL SPS configurations configured with Uplink Semi-Persistent Scheduling V-RNTI, the UE behaviour is undefined.

Early data transmission (EDT) is described.

With the introduction of the new RRC state (i.e., RRC-INACTIVE state) in NR, the UE may incur minimum signalling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

EDT for Control Plane CIoT EPS optimizations, as defined in TS 24.301 [20], is characterized as below:
Uplink user data are transmitted in a NAS message concatenated in UL RRCEarlyDataRequest message on CCCH;
Downlink user data are optionally transmitted in a NAS message concatenated in DL RRCEarlyDataComplete message on CCCH;
There is no transition to RRC CONNECTED.

The EDT procedure for Control Plane CIoT EPS optimizations is described as below.

1. Upon connection establishment request for Mobile Originated data from the upper layers, the UE initiates the early data transmission procedure and selects a random access preamble configured for EDT.

2. UE sends RRCEarlyDataRequest message concatenating the user data on CCCH.

3. The eNB initiates the S1-AP Initial UE message procedure to forward the NAS message and establish the S1 connection. The eNB may indicate in this procedure that this connection is triggered for EDT.

4. The MME requests the S-GW to re-activate the EPS bearers for the UE.

5. The MME sends the uplink data to the S-GW.

6. If downlink data are available, the S-GW sends the downlink data to the MME.

7. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.

8. If no further data are expected, the eNB can send the RRCEarlyDataComplete message on CCCH to keep the UE in RRC_IDLE. If downlink data were received in step 7, they are concatenated in RRCEarlyDataComplete message.

9. The S1 connection is released and the EPS bearers are deactivated.

If the MME or the eNB decides to move the UE in RRC_CONNECTED mode, RRCConnectionSetup message is sent in step 8 to fall back to the legacy RRC Connection establishment procedure; the eNB will discard the zero-length NAS PDU received in msg5.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

According to the prior art, a UE may receive downlink data in RRC_IDLE or RRC_INACTIVE or RRC_CONNECTED. However, when paging is received, the UE may not know how downlink data will be transmitted. Thus, UE cannot know how to respond to Paging. For example, when the UE receives a paging, the UE may transmit a response message via a configured grant, or via a RACH procedure. That is, the UE may not recognize which resource to use for transmitting the response message. Therefore, there is requirement for instructing the UE how to response to the paging.

Figure 7:
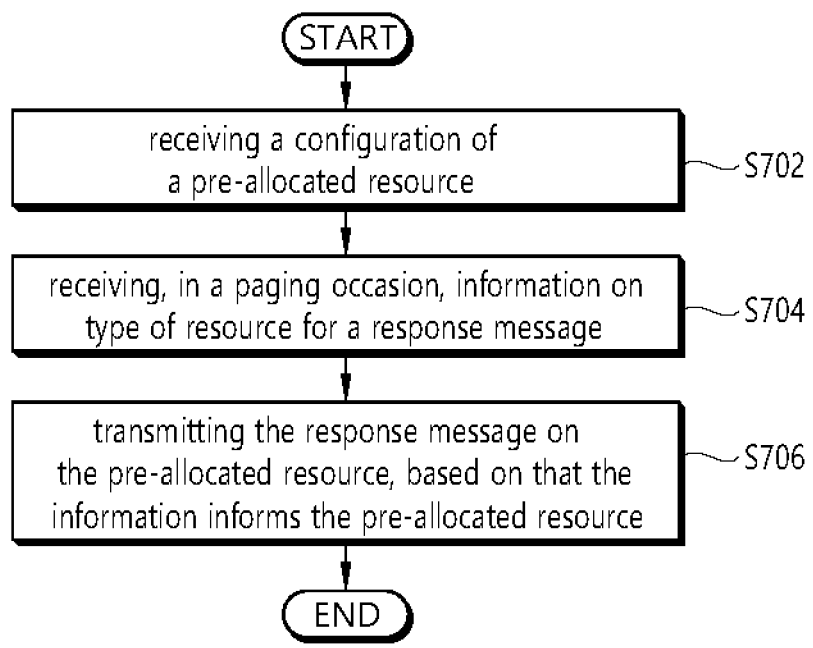
FIG. 7 shows a method for responding to paging according to an embodiment of the present disclosure.

FIG. 7 shows a method for responding to paging according to an embodiment of the present disclosure. In this embodiment, a wireless device may communicate with at least one of a mobile terminal, a network or autonomous vehicles other than the wireless device.

In step S702, the wireless device may receive a configuration of a pre-allocated resource. The pre-allocated resource may be a configured grant.

In step S704, the wireless device may receive, in a paging occasion, information on type of resource used for a response message. The type of resource may include at least one of random access channel (RACH) resources, semi-persistent scheduling (SPS) resources, configured grants and dynamic grants. The pre-allocated resource is activated upon receiving the information informing the pre-allocated resource. The paging occasion may be assigned to the wireless device. The information may be received by the wireless device after the wireless device leaves a radio resource control (RRC) connected state.

In step S706, the wireless device may transmit the response message on the pre-allocated resource, based on that the information informs the pre-allocated resource.

Further, the wireless device may receive downlink data based on the pre-allocated resource. Further, the wireless device may transmit the response message via random access procedure, based on the information informing initiation of the random access procedure. The downlink data may be transmitted via media access control (MAC) packet data unit (PDU) on the random access procedure.

According to an embodiment of the present disclosure, a wireless device may receive a Paging indicating either configured grant (referred as SPS resource) or RACH for downlink data reception in Mobile Terminating Access. If the configured grant is indicated, the wireless device may respond to the Paging by sending uplink information via configured grant. Then, the wireless device may receive downlink data after sending the uplink information indicating the wireless device. If RACH is indicated, the wireless device may respond to the Paging by initiating RACH procedure. Then, wireless device may receive downlink data after sending a RACH preamble and the uplink information indicating the wireless device.

Figure 8:
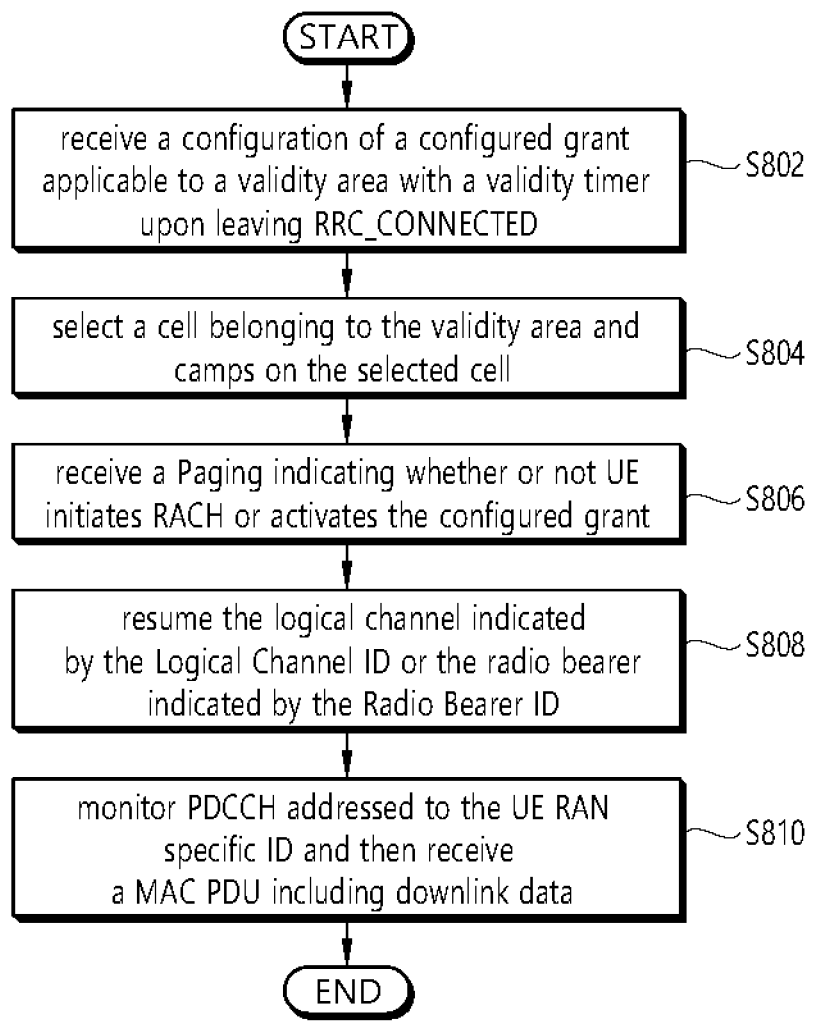
FIG. 8 shows a method for responding to paging according to an embodiment of the present disclosure.

FIG. 8 shows a method for responding to paging according to an embodiment of the present disclosure. In this embodiment, a UE may be not only a terminal device, but also any types of device operating as wireless device, for example an integrated access backhaul (IAB) node.

In step S802, the UE may receive a configuration of a configured grant applicable to a validity area with a validity timer upon leaving RRC_CONNECTED. The configured grant may be a resource of a Semi-Persistent Scheduling (SPS) configuration. The configured grant may be also referred as a SPS resource. The configured grant may be valid only for a logical channel. The validity area may consist of one or more cells. The configuration of the configured grant may include a maximum amount of data (or maximum data rate) supported by the configured grant. The configuration of the configured grant may include a UE Identity such as a SPS-I-RNTI which is used by UE when UE performs uplink transmission with the configured grant or downlink reception while in RRC_IDLE or RRC_INACTIVE.

In step S804, the UE may select a cell belonging to the validity area and camps on the selected cell. The UE may be in RRC_IDLE or RRC_INACTIVE.

In step S806, the UE may receive a Paging indicating whether or not UE initiates RACH or activates the configured grant, and/or a UE CN specific ID and/or the UE RAN specific ID and/or a Logical Channel ID (or a Radio Bearer ID) corresponding to one or more of the suspended radio bearers for Mobile Terminating Access. The Paging may be one of Downlink Control Information of PDCCH or a Paging message. The Paging may indicate a RACH preamble. The UE may be in RRC_IDLE or RRC_INACTIVE.

In step S808, upon receiving the Paging, the UE may resume the logical channel indicated by the Logical Channel ID or the radio bearer indicated by the Radio Bearer ID while still suspending the other logical channel(s) (or the other radio bearers).

Upon receiving the Paging indicating activation of the configured grant, if one of the following conditions is met, the UE may activate the configured grant and then transmits uplink information indicating the Logical Channel ID (or the Radio Bearer ID) and the UE RAN specific ID via the configured grant to the network.
- when UE receives system information or dedicated message indicating data transmission in RRC_IDLE (or RRC_INACTIVE) for the logical channel or the configured grant from the network;
- when the Timer Alignment Timer is running;
- when the validity timer associated with the configured grant is running;
- when the UE is located in the validity area associated with the configured grant;
- when the logical channel is mapped to the configuration or the configured grant;

The configured grant may be used in following retransmission.

Upon receiving the Paging, if one of the following conditions is met, the UE may initiate Random Access procedure and transmits uplink information indicating the Logical Channel ID (or the Radio Bearer ID) and the UE RAN specific ID via RACH message 3 to the network.
- when the Paging indicates initiation of RACH;
- when UE receives system information or dedicated message indicating Early Data Transmission for the logical channel or the configured grant from the network;
- when the Timer Alignment Timer expires (and data becomes available);
- when the validity timer associated with the configured grant expires (and data becomes available);
- when the UE leaves the validity area associated with the configured grant (and data becomes available);
- when the logical channel is not mapped to the grant configuration or the configured grant;

In step S810, the UE may monitor PDCCH addressed to the UE RAN specific ID and then receive a MAC PDU including downlink data based on the PDCCH from the network, while in RRC_IDLE or RRC_INACTIVE.

The MAC PDU may include one or more MAC SDU including downlink data and the resumed Logical Channel ID (or the resumed Radio Bearer ID) and the UE RAN specific ID.

According to embodiments of the present disclosure, the UE may recognize the resource type to be used for delivering DL data, by informing the information on the resource type via paging. Further, the UE may activate configured grant by receiving paging, so that the activating process may be simplified.

Figure 9:
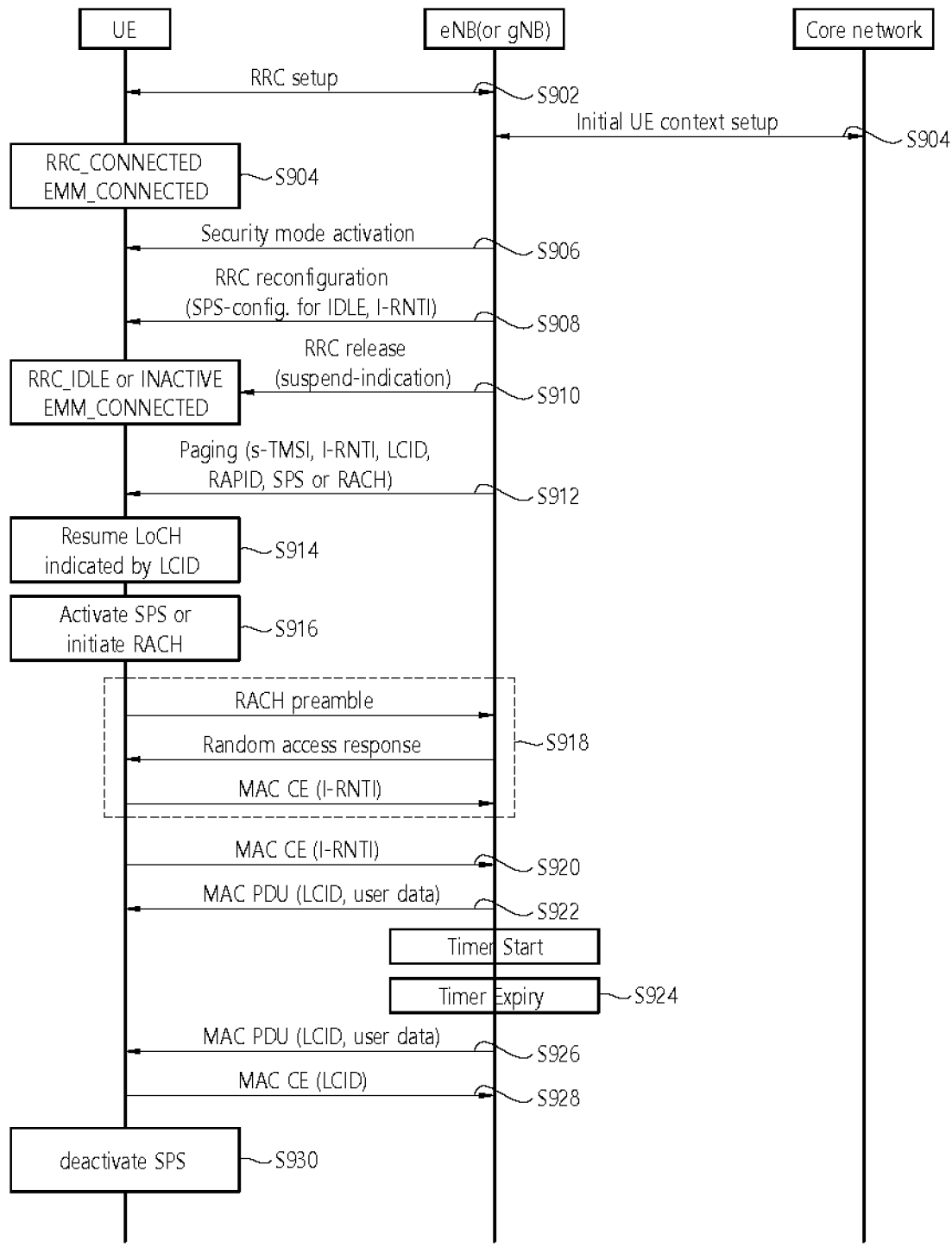
FIG. 9 shows an example of response to paging according to an embodiment of the present disclosure.

FIG. 9 shows an example of response to paging according to an embodiment of the present disclosure. In this embodiment, a UE may be not only a terminal device, but also any types of device operating as wireless device, for example an integrated access backhaul (IAB) node. In this description, a SPS resource or a SPS grant may be referred as a configured grant, and the SPS configuration may be a configuration for configured grant.

In step S902, the UE and the base station may be configured to setup RRC connection.

In step S904, the UE may enter RRC_CONNECTED and EMM_CONNECTED at a serving cell. The initial UE context setup may be performed between the base station and the core network.

In step S906, the UE may perform Security Mode Activation to activate AS security.

In step S908, the UE may perform RRC Connection Reconfiguration to configure SPS configuration with SPS-I-RNTI which is used for data transmission in RRC_IDLE. UE may receive SPS configuration state via system information regardless of RRC state. The SPS configuration may be used when the UE leaves the RRC connected state. The UE may start or re-start TAT while in RRC_CONNECTED. Then, UE may continue running TAT after leaving RRC_CONNECTED.

The SPS configuration may include at least one of uplink and/or downlink SPS resources as uplink and/or downlink configured grants, PRB or narrowband index, a validity area, a validity timer, valid logical channels, maximum amount of data (or maximum data rate) supported by the configured grant, and UE Identity such as a SPS-I-RNTI which is used by UE when UE performs uplink transmission with the configured grant. The configured grant may be valid in the validity area consisting of one or more cells including the serving cell.

The SPS configuration or the SPS configured grant may be valid in the configured PRB or narrowband while UE is in RRC_IDLE. RRC Release or Paging or MAC Control Element or PDCCH received in RRC_IDLE may indicate SPS activation with a PRB index or a narrowband index for a particular configured grant. Upon receiving such SPS activation with a PRB index or a narrowband index, the UE in RRC_IDLE may consider the SPS configured grant or the SPS configuration as activated on the PRB or the narrowband indicated by the index.

The SPS configured grant may be valid while the validity timer is running. The validity timer may be a timeAlignmentTimer (TAT) or another timer. The validity timer may be configured for each configured grant. The UE may start or restart the validity timer (e.g. TAT) when the configured grant is received or when UE leaves RRC_CONNECTED or when Timing Advance Command is received e.g. via MAC Control Element, Random Access Response, RRC Release message, or Paging message in RRC_IDLE after leaving RRC_CONNECTED. The network may periodically send Timing Advance Command to UE in RRC_IDLE e.g. by Paging message in UE's Paging Occasion or MAC Control Element via DL SPS configured grant.

The SPS configured grant may be valid only for configured valid logical channels. Thus, only when UE may transmit data from the valid logical channel, the UE may use the SPS configured grant to transmit data.

In step S910, when UE receives RRC Release message or RRC Release Indication (e.g. via PDCCH or MAC Control Element), the UE may leave RRC_CONNECTED. Then, UE goes to RRC_IDLE. After that, the UE may transmit user data via the configured grant.

If RRC Release indicates uplink SPS activation for a particular SPS configured grant, when data becomes available for uplink transmission in RRC_IDLE or RRC_INACTIVE, the UE may construct a MAC PDU including SPS Confirmation MAC Control Element with user data. The SPS Confirmation MAC CE may indicate which SPS configured grant(s) is activated or deactivated.

The UE may periodically transmit SPS Confirmation MAC CE to inform the network which configured grant(s) is currently activated or deactivated.

In RRC_IDLE or RRC_INACTIVE, the UE may perform cell reselection. If the UE performs cell reselection and camps on another cell belonging to the validity area, the UE may send SPS confirmation to the network to inform the network which configured grant(s) is currently activated or deactivated.

In step S912, when user data is generated, the base station may transmit a Paging. The UE may receive a paging indicating whether or not to initiate RACH or activate the configured grant. The paging may inform a UE CN specific ID and/or the UE RAN specific ID and/or a Logical Channel ID (or a Radio Bearer ID) corresponding to one or more of the suspended radio bearers for Mobile Terminating Access. The paging may be one of downlink control information (DCI) of PDCCH or a paging message. The paging may inform a RACH preamble. The UE may be in RRC_IDLE or RRC_INACTIVE.

In step S914, upon receiving the Paging, the UE may resume the logical channel indicated by the Logical Channel ID or the radio bearer indicated by the Radio Bearer ID while still suspending the other logical channel(s) (or the other radio bearers).

In step 916, the UE may activate configured grant or initiate RACH procedure, depending on the indication included in the paging.

Upon receiving the paging indicating activation of the configured grant, if one of the following conditions is met, the UE may activate the configured grant.
  when UE receives system information or dedicated message indicating data transmission in RRC_IDLE (or RRC_INACTIVE) for the logical channel or the configured grant from the network;
  when the Timer Alignment Timer is running;
  when the validity timer associated with the configured grant is running;
  when the UE is located in the validity area associated with the configured grant;
  when the logical channel is mapped to the SPS configuration or the configured grant;

Upon receiving the paging indicating the initiation of RACH, if one of the following conditions is met, the UE may initiate Random Access procedure.
  when UE receives system information or dedicated message indicating Early Data Transmission for the logical channel or the configured grant from the network;
  when the Timer Alignment Timer expires (and data becomes available);
  when the validity timer associated with the configured grant expires (and data becomes available);
  when the UE leaves the validity area associated with the configured grant (and data becomes available);
  when the logical channel is not mapped to the SPS configuration or the configured grant;

In step S918, when the UE decided to initiate RACH, the UE may transmit uplink information indicating the Logical Channel ID (or the Radio Bearer ID) and the UE RAN specific ID via RACH message 3 to the network. In specific, when the paging indicates the initiation of RACH, the UE may transmit a RACH preamble as a response to the paging. Further, the UE may receive random access response for the RACH preamble. In response to the random access response, the UE may transmit Logical Channel ID (or the Radio Bearer ID) and the UE RAN specific ID via the RACH procedure, especially via message 3.

In step S920, when the UE decided to activate the configured grant, the UE may transmit uplink information indicating the Logical Channel ID (or the Radio Bearer ID) and the UE RAN specific ID via the configured grant to the network. That is, the UE may respond to the paging by using the configured grant. Therefore, the UE may transmit MAC CE including I-RNTI via the configured grant.

In step S922, the UE may monitor PDCCH addressed to the UE RAN specific ID. The UE may receive a MAC PDU including downlink data based on the PDCCH from the network, while in RRC_IDLE or RRC_INACTIVE.

The MAC PDU may include one or more MAC SDU including downlink data and the resumed Logical Channel ID (or the resumed Radio Bearer ID) and the UE RAN specific ID.

If UE successfully decode the MAC PDU, the UE may transmit uplink information indicating the Logical Channel ID (or the Radio Bearer ID) as RACH message 3 to the network as ACK to the MAC PDU. Else if UE fails to decode the MAC PDU, the UE may not transmit uplink information e.g. indicating NACK or transmit a RACH preamble indicating NACK. In this case, when the base station transmits the MAC PDU, the base station may start a timer.

In step S924, the timer may expire. Upon timer expiry, if the uplink information has been not received, the base station may consider transmission of the MAC PDU as unsuccessful.

In step S926, the base station may re-transmit the MAC PDU. The UE may detect failure of decoding the MAC PDU based on CRC attached to the MAC PDU.

In step S928, the UE may transmit uplink information. The uplink information may be at least one of L1 Uplink Control Information, a MAC Control Element, RLC/PDCP Control PDU and a RRC message. The uplink information may include the UE RAN specific ID.

Alternatively, if UE fails to decode the MAC PDU, the UE may transmit uplink information indicating the Logical Channel ID (or the Radio Bearer ID) to the network as NACK to the MAC PDU. Else if UE successfully decode the MAC PDU, the UE may not transmit uplink information indicating ACK or transmit a RACH preamble indicating ACK. In this case, when the base station transmits the MAC PDU, the base station may start a timer. Upon timer expiry, if the uplink information has been not received, the base station may consider transmission of the MAC PDU as successful. So, the base station may not re-transmit the MAC PDU.

If the MAC PDU includes a MAC SDU corresponding to the resumed logical channel (or the resumed radio bearer) in downlink, UE MAC entity may deliver the MAC SDU to upper layers. If the MAC PDU includes a MAC SDU corresponding to a suspended logical channel (or the suspended radio bearer) in downlink, UE MAC entity discards the MAC SDU, i.e. no delivery to upper layers.

If UE receives a RRC Setup message and a RRC Resume message from the network, the UE may enter RRC_CONNECTED and then send a RRC Setup Complete or a RRC Resume Complete message to UE. Or, if UE receives an EarlyDataComplete message from the network, the UE may consider this procedure as successfully completed.

In step S930, if UE transmitted the uplink information indicating ACK via the configured grant, the UE may deactivate the configured grant. Or, if UE transmitted the uplink information indicating NACK up to N times via the configured grant, the UE may deactivate the configured grant.

According to embodiments of the present disclosure, UE in RRC_IDLE may perform uplink transmissions by using the configured grant. The configured grant may be either contention based or contention free. The UE in RRC_IDLE may transmit data with UE ID such as SPS-I-RNTI or S-TMSI in contention based SPS configured grant. The UE in RRC_IDLE may include UE ID in a RRC message or a MAC CE to be transmitted in uplink.

Before transmitting a MAC PDU by using contention based configured grant, the UE in RRC_IDLE may perform Access Barring Check to determine whether or not to perform transmission of the MAC PDU via the configured grant based on barring information received from system information. If access attempt is allowed as the result of Access Barring Check, the UE may perform transmission of the MAC PDU.

The network may indicate to UE whether the configured grant or the SPS configuration requires Access Barring Check. Thus, if indicated, UE MAC entity may request UE RRC entity to perform Access Barring Check before transmission of the MAC PDU via the configured grant. Then, UE RRC entity may inform UE MAC layer about the result of the Access Barring Check. If access attempt is allowed as the result of Access Barring Check, UE MAC entity may perform transmission of the MAC PDU.

If UE in RRC_IDLE should transmit a MAC PDU with UE ID such as SPS-I-RNTI or S-TMSI in contention based configured grant, UE MAC entity may consider transmission of the MAC PDU as successful after contention resolution message as well as positive HARQ feedback is received in downlink.

Meanwhile, UE in RRC_IDLE (or RRC_INACTIVE) may transmit data without UE ID in contention free configured grant. The UE may not need to perform Access Barring Check before transmitting MAC PDU by using contention free configured grant. In this case, UE MAC entity may consider transmission of the MAC PDU as successful after positive HARQ feedback is received in downlink without contention resolution message.

When UE goes RRC_IDLE by receiving RRC Release, RRC Release message may indicate downlink activation for a particular configured grant. Then, the UE may activate the downlink configured grant. When data becomes available for downlink transmission in RRC_IDLE, the network may send user data by using the DL configured grant. The network may indicate to UE that the DL SPS is deactivated by sending Paging, MAC Control Element or PDCCH to the UE in RRC_IDLE. Then, UE may transmit DL data via the configured grant.

When UE goes RRC_IDLE by receiving RRC Release, RRC Release message may indicate downlink deactivation for a particular configured grant. Or, the network may indicate to UE that the DL configured grant is deactivated by sending Paging, MAC Control Element or PDCCH to the UE in RRC_IDLE. In this case, the network may indicate to UE that the DL configured grant is activated by sending Paging, MAC Control Element or PDCCH to the UE in RRC_IDLE. Then, UE may transmit DL data via the configured grant.

System information or other L1/L2/L3 message (such as Downlink Control Information in PDCCH addressed to SPS-I-RNTI, MAC Control Element, Paging message or RRC Release message) may indicate to UE(s) in RRC_IDLE or RRC_INACTIVE whether UE should perform data transmission in RRC_IDLE or RRC_INACTIVE with EDT or the Configured Grant for a logical channel or a configured grant. If EDT is indicated for a logical channel or a configured grant, when data becomes available for uplink transmission for the logical channel or the configured grant, UE in RRC_IDLE or RRC_INACTIVE may perform RACH procedure for EDT. If EDT is not indicated or a SPS is indicated for a logical channel or a configured grant, when data becomes available for uplink transmission for the logical channel or the configured grant, the UE may perform data transmission via the SPS configured grant while in RRC_IDLE or RRC_INACTIVE.

In details, (if EDT is indicated in system information and data becomes available for transmission), when the TAT expires, or when the validity timer expires, or when UE leaves the validity area, or when data becomes available for a logical channel not mapped to the SPS configuration or the configured grant, or when data becomes available and the amount of data available for transmission is beyond the maximum amount of data (or the maximum data rate), if conditions for Early Data Transmission (EDT) are met, the UE may initiate Random Access procedure to perform EDT procedure. (But, if conditions for EDT are not met, UE performs RRC Connection Establishment or RRC Resume procedure). So, UE may transmit RACH preamble with a RAPID set to EDT. (In addition, UE deactivates the corresponding SPS configured grant or suspend the SPS configuration or release the SPS configuration. The RAPID may be associated with Early Data Transmission (EDT) or the SPS configuration or the SPS configured grant.)

In response to the RACH preamble, the network may send Random Access Response (RAR) message to the UE. The RAR message may include RAPID, Time Advance command, and SPS-I-RNTI. In addition, the RAR message (or system information) may indicate which type of message 3 UE should send (e.g. EarlyDataRequest, RRCConnectionRequest or RRCResumeRequest) or which procedure UE should trigger for message 3 (e.g. EDT for Control Plane (CP) CIoT Optimization, EDT for User Plane (UP) CIoT Optimization, RRC Connection Establishment or RRC Resume procedure).

Based on the RAR message, the UE may transmit message 3, e.g. one of EarlyDataRequest, RRCConnectionRequest or RRCResumeRequest, possibly with user data. In message 4, UE may receive SPS reconfiguration and new SPS-I-RNTI. If UE enters RRC_CONNECTED after receiving message 4, the UE may transmit user data in RRC_CONNECTED.

When UE receives message 4 for EDT CP or UP, UE may not enter RRC_CONNECTED. As a result, the UE may keep staying in RRC_IDLE. The message 4 may include SPS configuration so that UE reconfigures SPS accordingly for data transmission in RRC_IDLE.

According to embodiments of the present disclosure, the UE may recognize the resource type to be used for delivering DL data, by informing the information on the resource type via paging. Further, the UE may activate configured grant by receiving paging, so that the activating process may be simplified.

Figure 10:
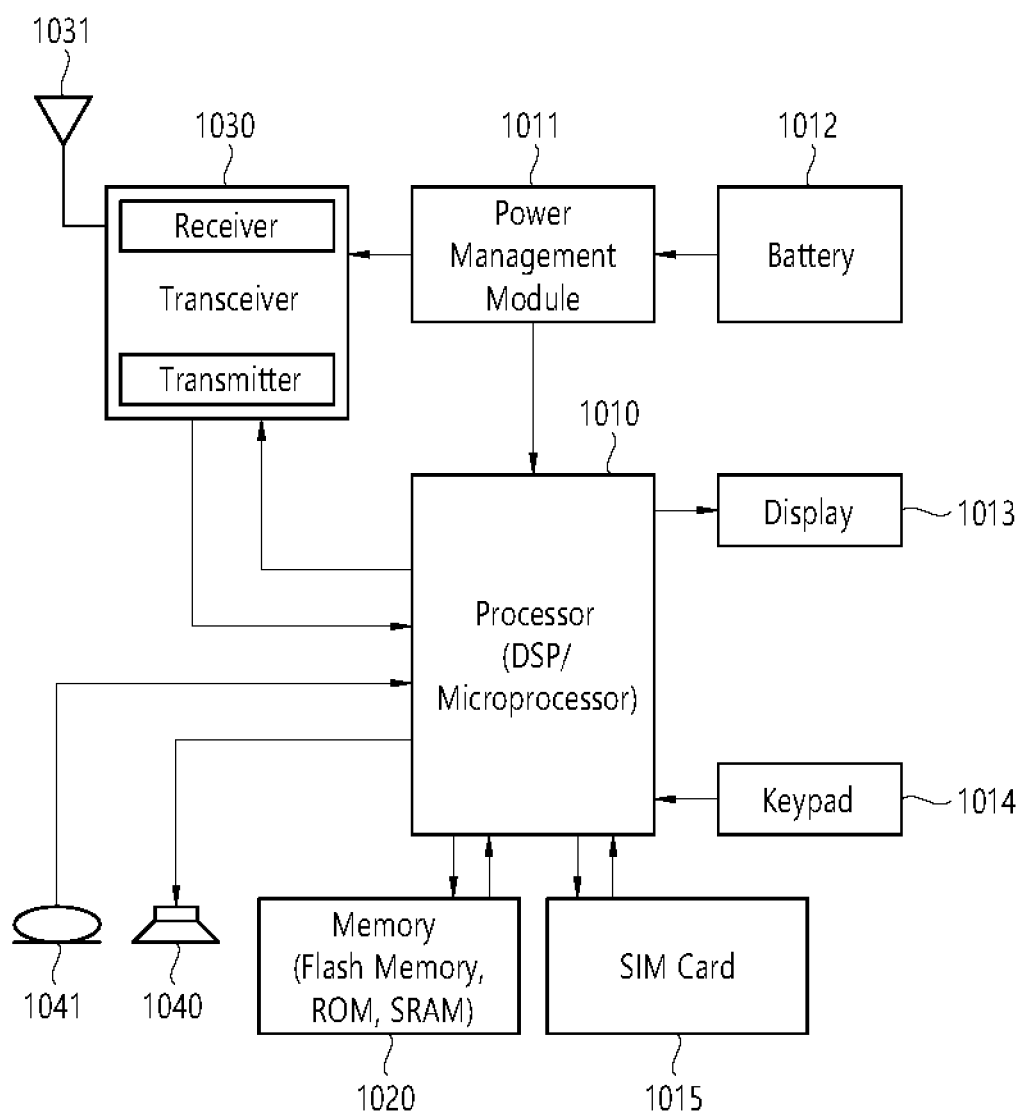
FIG. 10 shows more detailed wireless device to implement an embodiment of the present disclosure.

FIG. 10 shows more detailed wireless device to implement an embodiment of the present disclosure. The present disclosure described above for wireless device side may be applied to this embodiment.

A wireless device includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include ASIC, other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present disclosure, the processor 1010 may be configured to receive a configuration of a pre-allocated resource. The pre-allocated resource may be a configured grant.

The processor 1010 may be configured to receive, in a paging occasion, information on type of resource used for a response message. The type of resource may include at least one of random access channel (RACH) resources, semi-persistent scheduling (SPS) resources, configured grants and dynamic grants. The pre-allocated resource is activated upon receiving the information informing the pre-allocated resource. The paging occasion may be assigned to the wireless device. The information may be received by the wireless device after the wireless device leaves a radio resource control (RRC) connected state.

The processor 1010 may be configured to transmit the response message on the pre-allocated resource, based on that the information informs the pre-allocated resource.

Further, the processor 1010 may be configured to receive downlink data based on the pre-allocated resource. Further, the wireless device may transmit the response message via random access procedure, based on the information informing initiation of the random access procedure. The downlink data may be transmitted via media access control (MAC) packet data unit (PDU) on the random access procedure.

According to an embodiment of the present disclosure, a UE may receive a Paging indicating either configured grant (referred as SPS resource) or RACH for downlink data reception in Mobile Terminating Access. If the configured grant is indicated, the UE may respond to the Paging by sending uplink information via configured grant. Then, the UE may receive downlink data after sending the uplink information indicating the UE. If RACH is indicated, the UE may respond to the Paging by initiating RACH procedure. Then, UE may receive downlink data after sending a RACH preamble and the uplink information indicating the UE.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

The embodiments of the disclosure may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner XR technology can be applied to HMD, head-up display (HUD), mobile phone, tablet PC, laptop, desktop, TV, digital signage. A device to which the XR technology is applied may be referred to as an XR device.

Figure 11:
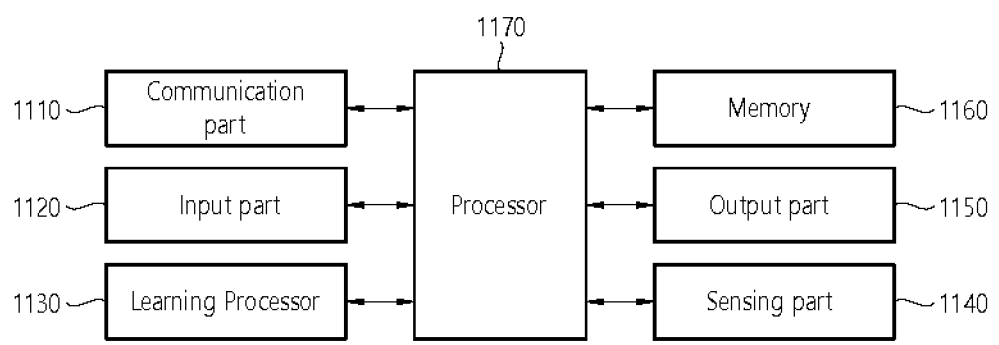
FIG. 11 shows an example of an AI device to which the technical features of the present disclosure can be applied.

FIG. 11 shows an example of an AI device to which the technical features of the disclosure can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1160, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1160, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc. The output part 1150 may include a display unit for outputting visual information, a speaker for outputting auditory information, and/or a haptic module for outputting tactile information.

The memory 1160 may store data that supports various functions of the AI device 1100. For example, the memory 1160 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1160, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1160 and/or the learning processor 1130, and/or transmit to an external device such as the AI server. The collected history information can be used to update the learning model. The processor 1170 may control at least some of the components of AI device 1100 to drive an application program stored in memory 1160. Furthermore, the processor 1170 may operate two or more of the components included in the AI device 1100 in combination with each other for driving the application program.

Figure 12:
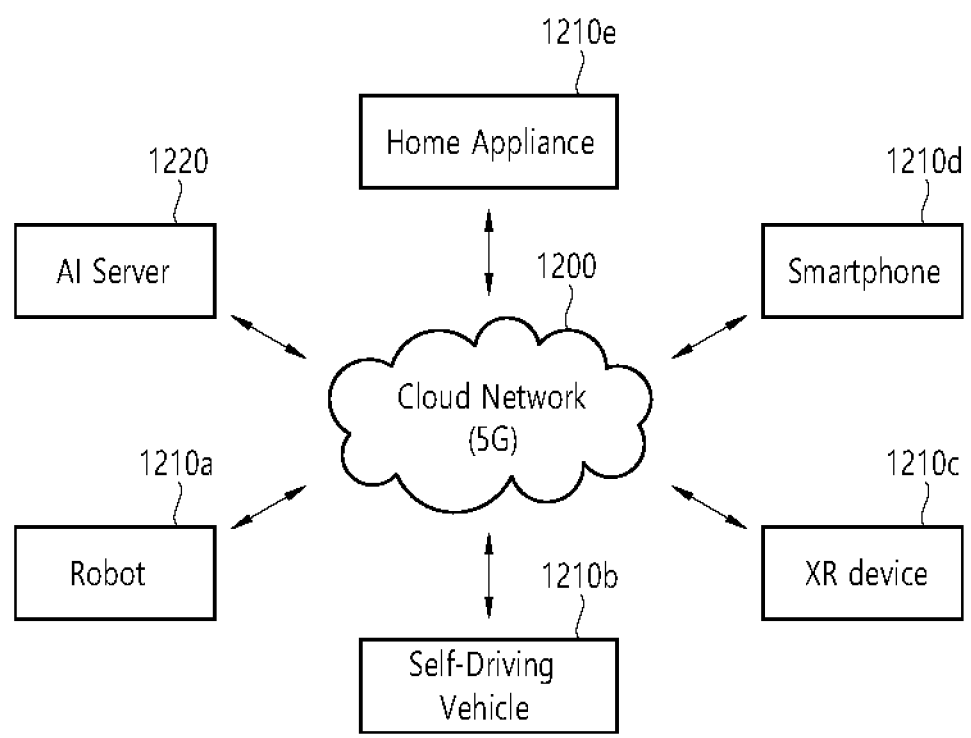
FIG. 12 shows an example of an AI system to which the technical features of the present disclosure can be applied.

FIG. 12 shows an example of an AI system to which the technical features of the present disclosure can be applied.

Referring to FIG. 12, in the AI system, at least one of an AI server 1220, a robot 1210*a*, an autonomous vehicle 1210*b*, an XR device 1210*c*, a smartphone 1210*d* and/or a home appliance 1210*e* is connected to a cloud network 1200. The robot 1210*a*, the autonomous vehicle 1210*b*, the XR device 1210*c*, the smartphone 1210*d*, and/or the home appliance 1210*e* to which the AI technology is applied may be referred to as AI devices 1210*a* to 1210*e*.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210*a* to 1210*e* and 1220 consisting the AI system may be connected to each other through the cloud network 1200. In particular, each of the devices 1210*a* to 1210*e* and 1220 may communicate with each other through a base station, but may directly communicate with each other without using a base station.

The AI server 1220 may include a server for performing AI processing and a server for performing operations on big data. The AI server 1220 is connected to at least one or more of AI devices constituting the AI system, i.e. the robot 1210*a*, the autonomous vehicle 1210*b*, the XR device 1210*c*, the smartphone 1210*d* and/or the home appliance 1210*e* through the cloud network 1200, and may assist at least some AI processing of the connected AI devices 1210*a* to 1210*e*. The AI server 1220 can learn the ANN according to the machine learning algorithm on behalf of the AI devices 1210*a* to 1210*e*, and can directly store the learning models and/or transmit them to the AI devices 1210*a* to 1210*e*. The AI server 1220 may receive the input data from the AI devices 1210*a* to 1210*e*, infer the result value with respect to the received input data using the learning model, generate a response and/or a control command based on the inferred result value, and transmit the generated data to the AI devices 1210*a* to 1210*e*. Alternatively, the AI devices 1210*a* to 1210*e* may directly infer a result value for the input data using a learning model, and generate a response and/or a control command based on the inferred result value.

Various embodiments of the AI devices 1210*a* to 1210*e* to which the technical features of the present disclosure can be applied will be described. The AI devices 1210*a* to 1210*e* shown in FIG. 12 can be seen as specific embodiments of the AI device 1100 shown in FIG. 11.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device adapted to operate in a wireless communication system, the method comprising:
　establishing a radio resource control (RRC) connection with a base station;
　entering an RRC_CONNECTED state;
　activating an access stratum (AS) security upon establishing the RRC connection;
　receiving an RRC reconfiguration message from the base station,
　wherein the RRC reconfiguration message includes i) a configuration for a configured grant, and ii) a radio network temporary identity (RNTI) related to the configured grant;
　receiving an RRC release message from the base station, wherein the RRC release message includes a suspend configuration;
　entering an RRC_INACTIVE state based on the suspend configuration;
　receiving a paging message from the base station,
　wherein the paging message includes a 5G S-temporary mobile subscriber identity (5G-S-TMSI),
　wherein the paging message further includes information on either the configured grant or a random access procedure;
　i) based on the paging message including information on the configured grant, transmitting uplink information to the base station via the configured grant in response to the paging message; and
　ii) based on the paging message including information on the random access procedure, initiating the random access procedure in response to the paging message.

2. The method of claim 1, wherein the information on the configured grant indicates activation of the configured grant.

3. The method of claim 1, wherein the paging message is received in a paging occasion assigned to the wireless device.

4. The method of claim 1, wherein the method further comprises:
　receiving downlink data after responding to the paging message.

5. The method of claim 1, wherein the wireless device communicates with at least one of a mobile terminal, a network or autonomous vehicles other than the wireless device.

6. The method of claim 1, wherein the paging message further includes a logical channel ID (LCID) related to one or more suspended radio bearers.

7. The method of claim 6, wherein the method further comprises:
resuming a logical channel based on the LCID while suspending other logical channels.

8. The method of claim 6, wherein the uplink information or the random access procedure includes the LCID.

9. A wireless device adapted to operate in a wireless communication system, the wireless device comprising:
a transceiver;
a processor; and
a memory operably connectable to the processor and storing instructions that, based on being executed by the processor, perform operations comprising:
establishing a radio resource control (RRC) connection with a base station;
entering an RRC_CONNECTED state;
activating an access stratum (AS) security upon establishing the RRC connection;
receiving, via the transceiver, an RRC reconfiguration message from the base station,
wherein the RRC reconfiguration message includes i) a configuration for a configured grant, and ii) a radio network temporary identity (RNTI) related to the configured grant;
receiving, via the transceiver, an RRC release message from the base station, wherein the RRC release message includes a suspend configuration;
entering an RRC_INACTIVE state based on the suspend configuration;
receiving, via the transceiver, a paging message from the base station,
wherein the paging message includes a 5G S-temporary mobile subscriber identity (5G-S-TMSI),
wherein the paging message further includes information on either the configured grant or a random access procedure;
i) based on the paging message including information on the configured grant, transmitting, via the transceiver, uplink information to the base station via the configured grant in response to the paging message; and
ii) based on the paging message including information on the random access procedure, initiating the random access procedure in response to the paging message.

10. The wireless device of claim 9, wherein the information on the configured grant indicates activation of the configured grant.

11. The wireless device of claim 9, wherein the paging message is received in a paging occasion assigned to the wireless device.

12. The wireless device of claim 9, wherein the operations further comprise:
receiving, via the transceiver, downlink data after responding to the paging message.

* * * * *